United States Patent
Lösch et al.

(10) Patent No.: US 7,455,728 B2
(45) Date of Patent: Nov. 25, 2008

(54) METHOD FOR RETARDING PLASTER SETTING AND PLASTER PREPARATION

(75) Inventors: Sabine Lösch, Hemsbach (DE); Thomas Staffel, Grünstadt (DE)

(73) Assignee: B.K. Giulini GmbH, Ludwigshafen (DE)

( * ) Notice: Subject to any disclaimer, the term of this patent is extended or adjusted under 35 U.S.C. 154(b) by 0 days.

(21) Appl. No.: 10/590,331

(22) PCT Filed: Aug. 12, 2005

(86) PCT No.: PCT/EP2005/008786

§ 371 (c)(1),
(2), (4) Date: Aug. 23, 2006

(87) PCT Pub. No.: WO2006/021332

PCT Pub. Date: Mar. 2, 2006

(65) Prior Publication Data

US 2007/0169670 A1    Jul. 26, 2007

(30) Foreign Application Priority Data

Aug. 24, 2004 (DE) .................. 10 2004 040 879

(51) Int. Cl.
*C04B 28/14* (2006.01)
*C04B 22/16* (2006.01)

(52) U.S. Cl. .................. 106/778; 106/287.26; 106/784; 106/810; 106/823

(58) Field of Classification Search ................. 106/778, 106/810, 287.26, 784, 823
See application file for complete search history.

(56) References Cited

U.S. PATENT DOCUMENTS

| | | | | |
|---|---|---|---|---|
| 3,770,468 A | * | 11/1973 | Knauf et al. | 106/675 |
| 5,746,822 A | * | 5/1998 | Espinoza et al. | 106/785 |
| 6,342,284 B1 | * | 1/2002 | Yu et al. | 428/70 |
| 6,398,864 B1 | * | 6/2002 | Przybysz et al. | 106/772 |

* cited by examiner

*Primary Examiner*—Anthony J Green
(74) *Attorney, Agent, or Firm*—Venable LLP; Keith G. Haddaway

(57) ABSTRACT

A method for retarding plaster setting and plaster preparations, relies upon a composition including a. tartaric acid in an amount of at least 0.01 to 1.0 weight % (based on plaster amount); b. sodium trimetaphosphate in an amount of 0.05 to 0.5 weight %, (plaster amount basis); and optionally c. sodium polyphosphate with an average chain length of at least 4 to 50 phosphate units.

4 Claims, 4 Drawing Sheets

METHOD FOR RETARDING PLASTER SETTING AND PLASTER PREPARATION

CROSS-REFERENCE TO RELATED APPLICATION

This application is a national phase of International Application No. PCT/EP2005/008786, filed Aug. 12, 2005, and claiming priority of German Application No. 10 2004 040 879.3, filed Aug. 24, 2004, the entire contents of which are incorporated herein by reference.

The present invention relates to a method for retarding plaster setting and to the plaster preparations, as well as a composition for said method.

FIELD OF INVENTION

Large amounts of plaster and plaster preparations are utilized in the building trade. The plaster materials used in the building trade also include stucco and facing plaster, which can furthermore contain different admixtures to achieve specific characteristics.

Stucco is a β hemihydrate and is for the most part used for producing gypsum plaster boards, gypsum building boards, and for producing interior finishes such as gypsum plaster and the like.

The facing plaster is composed of dehydration products of calcium sulfate dihydrate in the high-temperature and low-temperature range, in particular anhydrite II and β hemihydrate.

This type of plaster is also used for producing interior finishes and is somewhat more advantageous because it has a longer setting time and can therefore be machined longer than stucco.

Because of the relatively short setting times for stucco and facing plaster, processors were forced early on to find additives to successively process larger mixture batches on location, without being restricted by short working phases.

PRIOR ART

Substances suitable for retarding the setting of plaster have already been disclosed in prior art and literature, for example as described by Kruis and Späth, Benz, Harvey and Neville (compare also Kunze, R. A., Thayer, A. G., Gypsum and Plaster, Cem. Res. Prog. (1986), pp 267-283). The processing period for a gypsum product ranges from the start of the hardening (VB) to the end of the hardening (VE). The setting course can be determined with the aid of the released hydration heat (even though this is indirect and not precise; see Hans-Bertram Fischer, Martin Werner: HYDRATIONS-VERHALTEN VON GIPSMISCHUNGEN, STUCK, PUTZ, TROCKENBAU [Hydration Behavior of Gypsum Mixtures, Stucco, Facing Plaster, Drywall Construction], 9/94, pp 16-22), as well as with the Vicat method, DIN 1168, Part 2, or with the aid of ultrasonic measurements as described in Con. Chem.—Journal, 4 Yearly Edition No. 3/96.

Known retarding agents can essentially be divided into three groups:
  a. Polymers/copolymers on an acrylat base, e.g. as described in the EP 1270 530;
  b. Diverse phosphate salts, e.g. as described in U.S. Pat. No. 5,746,822;
  c. Carboxylic acids and derivatives thereof, e.g. as described in reference DE PS 22 26 943.

Reference DE PS 22 26 943 discloses the effect of primarily organic substances such as organic fruit acids, tartaric acid, and malic acid on the plaster setting process. Within the framework of this invention, it was discovered that the admixture of 0.1 weight % retarding agent, relative to the amount of plaster used, will retard the setting time by at least 10 minutes. Also described in this reference is an additional admixture, the polymerized glyoxal, which was added to the mixture in approximately equal amounts. The mixtures disclosed therein only delay the start of the plaster setting. However, controlling the total course is also necessary, meaning the start of the setting as well as the end of the setting.

The retarding effect of various compounds in dependence on the pH value of the gypsum is described in the journal ZEMENT, KALK, GIPS [Cement, Lime, Plaster], 1988, page 309 and following.

It was discovered that tartaric acid and tartaric acid salts have a good retardation effect on the setting of plaster only in the high-alkaline range, wherein a dosage of 0.2 weight % relative to the amount of plaster was tested. Mixtures with phosphates were neither described nor tested in this reference.

Reference DE 100 17 133 discloses a different method for retarding the setting of plaster and plaster preparations, characterized by the admixture of an amount of 0.001 to 1 weight %, relative to the plaster weight, of at least one polymer with recurring succinyl units. The polymer can be a poly asparagine acid or a poly succinimide, or one of their salts and has a molecular weight of 500 to 10,000, preferably of 1000 to 5000. The effect of these polymers is excellent and the difference between the start and the end of the setting is 25 minutes for a pure beta hemihydrate at a dosage of 0.03 weight %.

A different retarding agent was disclosed in the journal ZEMENT, KALK, GIPS INTERNATIONAL [Cement, Lime, Plaster International], No. 9, 1999. The effect of imidodisuccinate as retarding agent for machine-applied facing plaster at a dosage of 0.06 weight %, relative to the amount of plaster, is described therein as extremely advantageous. However, there is no mention of mixtures containing phosphates.

In this connection, we also want to point to the US Publication 20030100648, which discloses the use of a substance for improving the surface characteristics of a set plaster/set gypsum-containing material. The substance used therein is composed of a mixture containing at least one monobasic phosphate, one tri-metaphosphate, and one acryl polyphosphate. It was the object of said invention to improve the surface hardness, the abrasion resistance, and the resistance to water of the plaster surface. It appears that this improvement can be achieved only by preventing/inhibiting the so-called re-calcination, which in technical terms means the re-conversion of an already set plaster back to the hemihydrate form. This process is not identical to the retardation of the setting process of a hemihydrate. Sodium tri-metaphosphate is used in that case as cyclical phosphate. With this invention, the sodium tri-metaphosphate is used exclusively for solving the above-mentioned object, and the retarding of the plaster setting by using sodium tri-metaphosphate is not the object of the above-mentioned publication.

U.S. Pat. No. 5,746,822 discloses a joint-sealing compound for cement which also contains calcium sulfate hemihydrate as filler material. In order to control the processing time, this compound contains additional admixtures, among other things also phosphates, which retard the setting of the compound in the presence of water. Claim 2 describes the phosphate salts suitable for retarding the setting, for example zinc phosphate, tetra sodium pyrophosphate, sodium polyphosphate, mono ammonium phosphate, and monobasic potassium phosphate. A cyclical sodium trimetaphosphate is neither mentioned nor claimed in this reference.

The production of gypsum plaster board is described in reference U.S. Pat. No. 6,342,284. It is the object of said invention to improve the mechanical stability of the gypsum plaster boards when they are subjected to continuous stress. Different phosphate salts were tested in connection with this invention. Plaster mixtures, containing calcium sulfate hemi-hydrate, calcium sulfate di-hydrate, as well as anhydrate, were produced in combination with the different phosphate salts. Plaster mixtures containing, among other things, also sodium trimetaphosphate /STMP/ were produced according to Example 1. The compressive strength of the products was examined and the results listed in Table 1. It was found that the admixture of STMP was highly effective with respect to the compressive strength of the boards. Table 2 lists the mixtures for which the mechanical stability of the boards produced with said plaster compounds was tested. Here too, the mixture containing STMP proved to be particularly good. The plaster boards were subjected to a subsequent treatment /post treatment/ in a different test series using solutions of STMP. The solutions were sprayed onto the calcium sulfate dihydrate surface and allowed to dry again. Illustration 5 shows the excellent effect of STMP with respect to the sag deflection, meaning the bending strength of the boards. Even excellent results were obtained with STMP following a series of mechanical tests on the boards, it was discovered (lines 42 et seq. in column 4) that STMP does not have the effect of retarding the setting, meaning it does not increase the re-conversion rate of calcined plaster into calcium sulfate dihydrate. Reference U.S. Pat. No. 6,342,284 consequently did not disclose the aforementioned effect and, on the contrary, expressly negated this effect.

Figure 1:
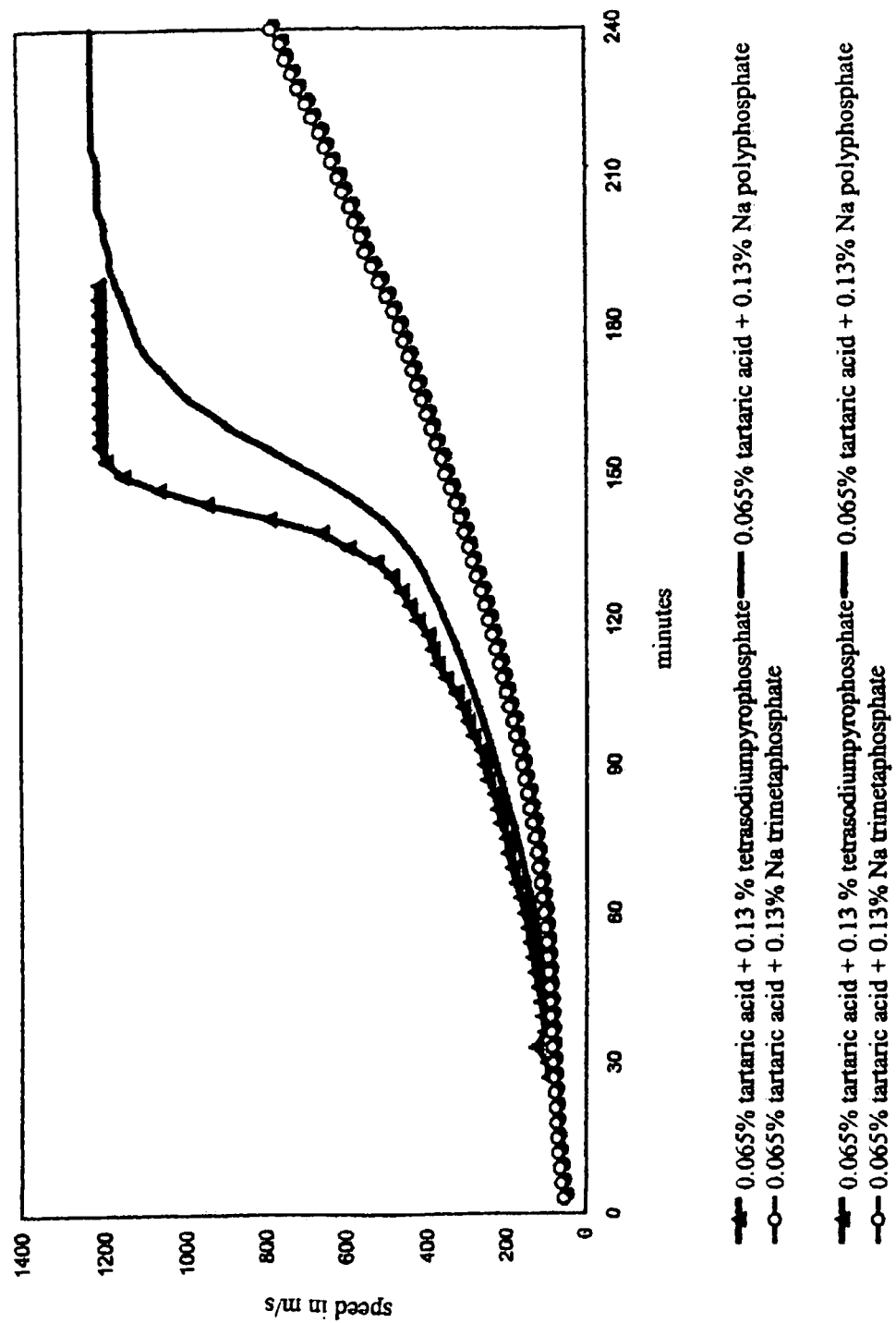
FIG. 1 is a graph of the plot of rate vs. time, of plaster setting results of Example 1.

It was the object of the present invention to find an additional and effective substance for retarding plaster setting and plaster preparations, such a machine-applied facing plaster, manually applied plaster, REA [flue gas desulphurization plant] plaster, as well as naturally occurring gypsum.

The object furthermore was to find additional and effective products to complement or replace the known retarding substances, such as tartaric acid or polyphosphates. Above all, one essential aspect of the problem definition was to discover a better way to control the setting process and, in particular, to determine the end of the setting process, thereby providing the individual applying the plaster with more time for processing the material.

Starting with the technical solutions described in further detail in the above, it was all the more surprising for the inventors of the present invention to discover that the traditionally used retarding substance tartaric acid could be combined with a phosphate salt mixture. On the one hand, this combination made it possible to achieve a noticeable reduction in the amount of tartaric acid used. On the other hand, the combination also allowed controlling the course of the setting, in particular the end of the setting process. Specifically, it resulted in a flattening of the characteristic curve during the setting operation, thereby providing the person applying the plaster with a longer processing window toward the end of the setting operation.

The method according to the present invention is characterized in that for retarding the setting of plaster and for the plaster preparations, a compound comprising the following components is used:

a. Tartaric acid in an amount of at least 0.01 to 1.0 weight %, relative to the amount of plaster;

b. Sodium trimetaphosphate in an amount of 0.05 to 0.5 weight % relative to the amount of plaster;

c. If necessary, sodium polyphosphate, having an average condensation degree of n=4 to 50, wherein for the phosphate salt mixture the previously mentioned components b and if applicable also c are used and the share of sodium trimetaphosphate in the phosphate salt mixture amounts to at least 50 weight percentages.

The components b and if applicable also c are mixed together in the dry state and are added to the plaster as retarding substance in the form of a fine-particle powder with a particle size distribution, for which at least 95% of the components are smaller than 200 μm. The plaster is then mixed in the standard way with water, or a starting batch is prepared, and is processed further.

The selection of the sodium trimetaphosphate from the large variety of known phosphates is new and is especially inventive. The inventors could not find any references in the known inventions for solving the defined problem of finding a different phosphate-containing substance for retarding the setting.

The sodium polyphosphate component c is a condensed phosphate with a chain length of at least 4 to 50, meaning 4 to 50 phosphate units are combined in linear direction.

The compound used according to the invention is sodium trimetaphosphate with the general formula $(Na_3(P_3O_9))$, a cyclical phosphate with CAS No: 7785-84-4, which is commercially available and can also be obtained from the BK Giulini GmbH under the trade name of Targon. The admixture of sodium trimetaphosphate considerably extends the open time window for processing the plaster. This effect was tested in application-technical experiments and the results presented in the following.

Application-technical experiments and results:

EXAMPLE 1

ILLUSTRATION 1 (FIG. 1):

For this experiment, 3 mixtures were tested in a commercially available plaster:

1. 0.065 weight % tartaric acid and 0.13 weight % tetrasodium pyrophosphate /comparison/
2. 0.065 weight % tartaric acid and 0.13 weight % sodium polyphosphate /comparison/
3. 0.065 weight % tartaric acid and 0.13 weight % sodium trimetaphosphate /according to the invention/.

The mixture 1 is not suitable because the available processing time is too short and the curve is too steep. The mixture 2 has a somewhat longer processing time, as shown by the flatter curve progression. The mixture 3 is particularly suitable because it has a flat curve, meaning the delay in the retarding of the setting at the end of the setting time is still quite long.

The best result is therefore achieved with the mixture 3, which contains sodium trimetaphosphate.

Example 2

Figure 2:
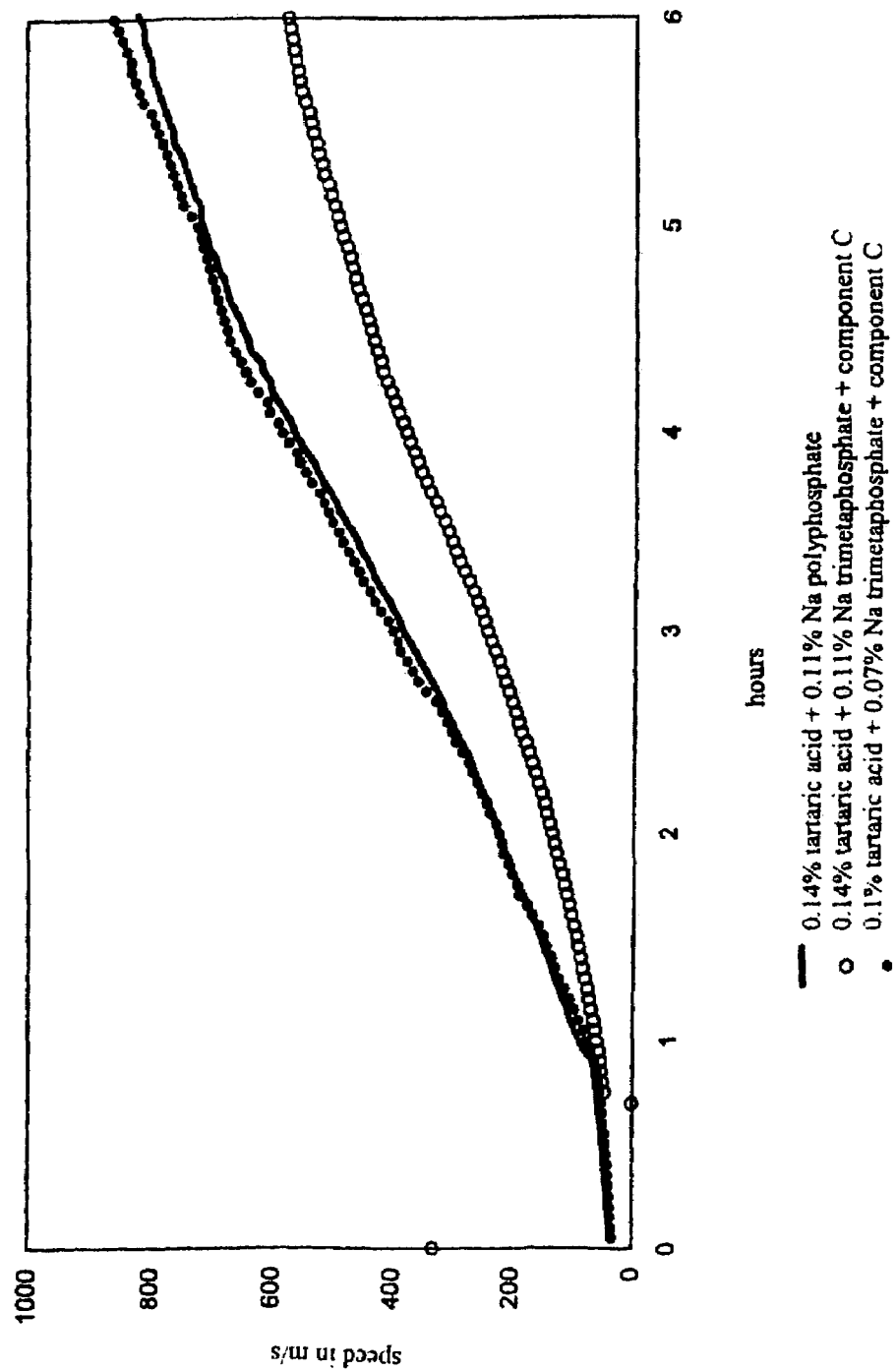
FIG. 2 is a graph of the plot of rate vs. time, of plaster setting results of Example 2.

Illustration 2 (FIG. 2)

For this experiment, manually-applied plaster was mixed with respectively 3 different retarding agent compounds:
1. 0.065 weight % tartaric acid and 0.13 weight % sodium polyphosphate
2. 0.065 weight % tartaric acid and 0.13 weight % sodium trimetaphosphate
3. 0.065 weight % tartaric acid and 0.075 weight % sodium trimetaphosphate The experiment showed that the mixture 2 is highly suitable and that even with a reduction in the sodium trimetaphosphate amount by 40%, the result is still better than for the mixture 1.

Example 3

Figure 3:
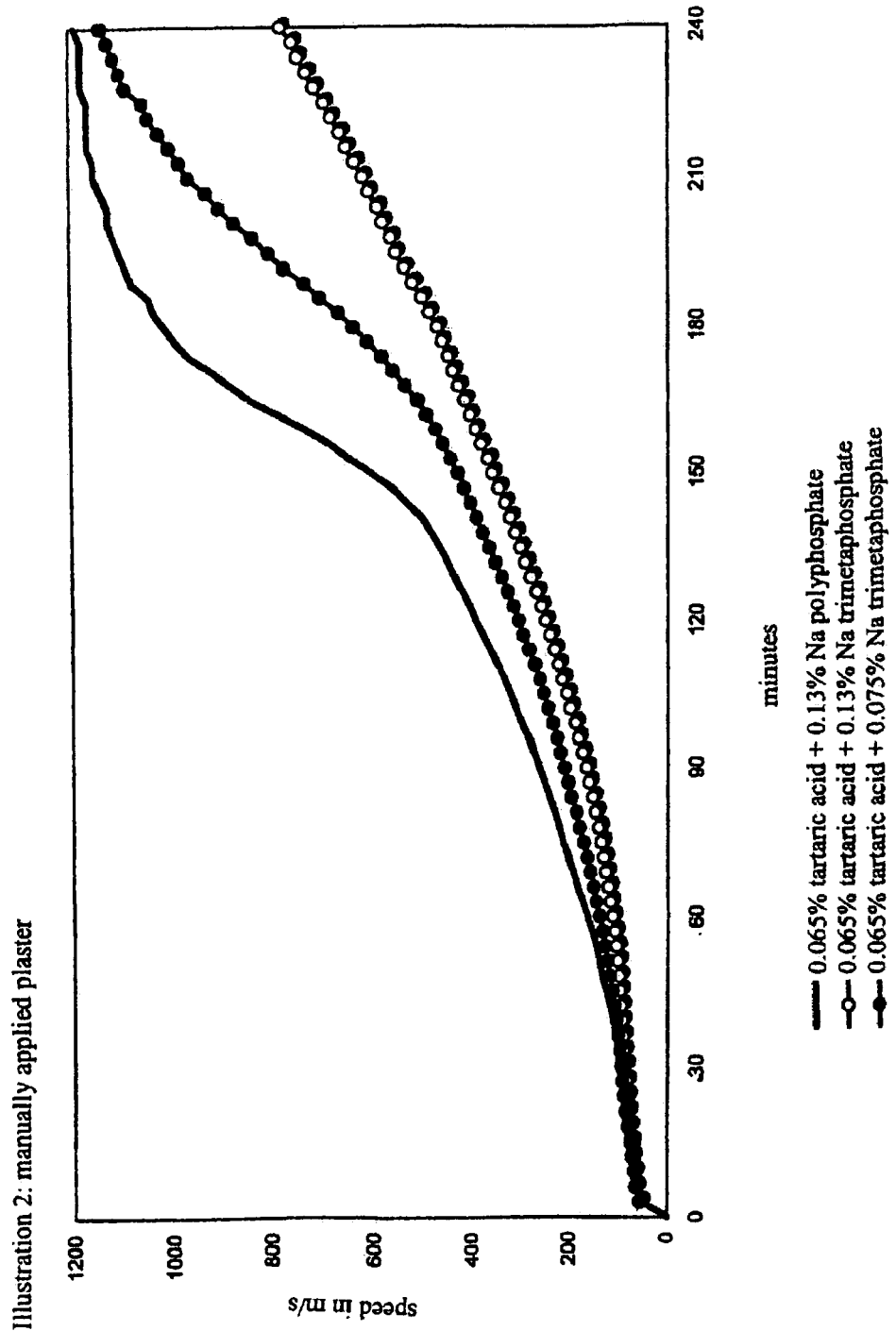
FIG. 3 is a graph of the plot of rate vs. time, of plaster setting results of Example 3.

Illustration 3 (FIG. 3)

A machine-applied plaster was mixed with 2 different mixtures and the setting process analyzed with respect to time:
1. 0.1 weight % tartaric acid and 0.14 weight % sodium polyphosphate
2. 0.1 weight % tartaric acid and 0.14 weight % sodium trimetaphosphate The result shows a clear improvement in the retardation effect of sodium trimetaphosphate as compared to the same dosage of sodium polyphosphate

Example 4

Figure 4:
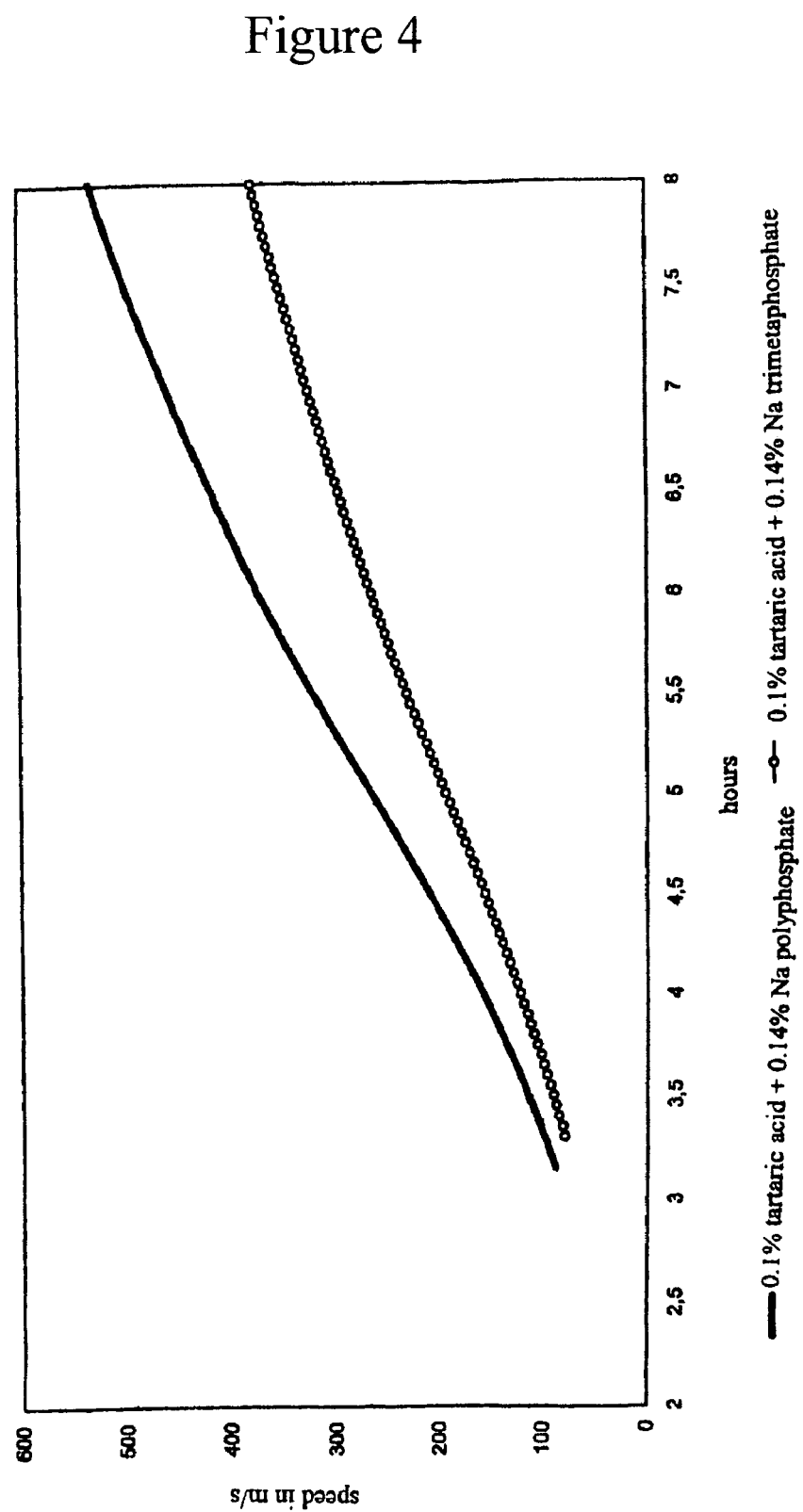
FIG. 4 is a graph of the plot of rate vs. time, of plaster setting results of Example 4.

Illustration 4 (FIG. 4)

A further test was conducted with a machine-applied plaster and the following mixtures:
1. 0.14 weight % tartaric acid and 0.11 weight % sodium polyphosphate
2. 0.14 weight % tartaric acid and 0.11 weight % of the phosphate salt combination according to the invention; wherein this combination contained 0.033 weight % sodium polyphosphate and 0.077 weight % sodium trimetaphosphate;
3. 0.1 weight % tartaric acid and 0.07 weight % of the phosphate salt combination according to the invention, with 0.021 weight % sodium polyphosphate and 0.049 weight % sodium trimetaphosphate.

In combination with tartaric acid as retarding substance, present in an amount of 0.1 weight %, the sodium trimetaphosphate can even be reduced by 40% as compared to the amount of sodium polyphosphate while the retarding process remains at an optimum level, especially toward the end of the setting period.

All phosphate salts used for this invention are commercially available.

Tetrasodium pyrophosphate has the formula $Na_4P_2O_7$; sodium polyphosphate has the formula $Na_nP_nO_{3n+1}$, with n=4 to 50, and sodium trimetaphosphate has the formula $(NaPO_3)_3$. These phosphates, which are all fine-particle powders, can also be obtained from the applicant.

Sodium polyphosphate is a condensed phosphate, produced from acidic mono-phosphates through thermal condensation and release of water. The salts which can be used within the framework of this invention have a condensation degree of n=4 to 50. The condensation degree indicates how many P atoms are present on the average in each molecule.

Sodium trimetaphosphate is a ring-shaped phosphate, produced through cooling of a corresponding polyphosphate melt and subsequent tempering above 350° C. However, the phosphate production is not the subject matter of the present invention. Tartaric acid has the formula $C_4H_6O_6$ and the chemical designation 2,3 dihydroxy butanedioic acid or also 2,3 dihydroxy succinic acid. It occurs in 3 stereoisomer forms and is a strong acid that is highly water soluble. Within the framework of this invention, the L form is used since the use of the other stereoisomer compounds is technically not possible since these compounds are not suitable.

The ultrasonic method is used for measuring the setting process.

This method is based on the fact that the speed of sound in the mixture to be analyzed constantly increases during the complete hydration course. The measuring operation does not cause damage and can be used as often as required, even for longer measuring intervals. For the following reasons, the ultrasonic measuring device is extremely suitable for measuring setting processes:

1. Following the preparation of the material to be analyzed, for example plaster, gypsum, mortar, or concrete, the speed of sound increases continuously as a result of the steady increase in the hardening and finally approaches a limit value at the end of the setting process.
2. The measuring device operates with a sound frequency of approximately 45 kHz, which is particularly suitable for measuring the relatively inhomogeneous material.
3. The measuring device can store approximately 500 measuring values. These values can be transferred to a PC following the measuring operation and can be displayed on the PC in the form of tables or curve illustrations.

We herewith also point to additional references, especially the essays written by the authors T. Staffel and G. Brix, "UNTERSUCHUNGEN DES ABBINDE-VERHALTENS VON ZEMENTMISCHUNGEN MIT DER ULTRA-SCHALL-METHODE BEI EINSATZ VERSCHIEDENER VERZÖGEREADDITIVE" [Analyses Of The Setting Behavior Of Cement Mixtures Using The Ultrasonic Method When Using Different Retarding Additives], published in ConChem Journal, No. 3, Year April 1996, and the reference by the author J. Balau, ConChem Journal Febuary 2, 1996.

The invention claimed is:

1. A method for retarding plaster setting and plaster preparations, comprising admixing with said plaster or said plaster preparations the following composition:
   a) tartaric acid in an amount of at least 0.01 to 1.0 weight % relative to the plaster amount;
   b) sodium trimetaphosphate in an amount of 0.05 to 0.5 weight %, relative to the plaster amount; and
   c) 0 to at least 0.01 weight %, relative to said plaster or said plaster preparations, sodium polyphosphate with an average chain length of at least 4 to 50 phosphate units; which is further
   characterized in that the components b) said sodium trimetaphosphate and/or c) sodium polyphosphate are mixed together in the dry state and are added to the plaster to be retarded in the form of a fine-particle powder, having a particle size distribution for which at least 95% of the components are smaller than 200µm.

2. The method for retarding plaster setting and plaster preparations as defined in claim 1, characterized in that said composition comprises an amount of sodium polyphosphate of at least 0.01 weight %, relative to the plaster amount.

3. An additive composition for retarding plaster setting and plaster preparations comprising the following components:
   a) tartaric acid in an amount of at least 0.01 to 1.0 weight %, relative to the plaster amount;
   b) sodium trimetaphosphate in an amount of 0.05 to 0.5 weight %, relative to the plaster amount, and
   c) 0 to at least 0.01 weight per cent sodium polyphosphate, having an average chain length of at least 4 to 50 phosphate units, wherein the components are added to the plaster and the plaster preparation to be retarded in the form of a fine-particle powder.

4. A method for retarding plaster setting and plaster preparations, comprising admixing with said plaster or said plaster preparations the following composition:
   a) tartaric acid in an amount of at least 0.01 to 1.0 weight %. relative to the plaster amount;
   b) sodium trimetaphosphate in an amount of 0.05 to 0.5 weight %. relative to the plaster amount, and
   c) 0 to at least 0.01 weight per cent sodium nolyphosphate. having an average chain length of at least 4 to 50 phosphate units, wherein the components are added to the plaster and the plaster preparation to be retarded in the form of a fine-particle powder.

* * * * *